(12) United States Patent
Levin

(10) Patent No.: US 8,057,838 B2
(45) Date of Patent: Nov. 15, 2011

(54) ANIMAL BY-PRODUCT PET TREAT

(75) Inventor: Mark Levin, Papillion, NE (US)

(73) Assignee: Sergeant's Pet Care Products, Omaha, NE (US)

( * ) Notice: Subject to any disclaimer, the term of this patent is extended or adjusted under 35 U.S.C. 154(b) by 1048 days.

(21) Appl. No.: 11/292,530

(22) Filed: Dec. 2, 2005

(65) Prior Publication Data

US 2007/0128337 A1    Jun. 7, 2007

(51) Int. Cl.
*A23K 1/10* (2006.01)

(52) U.S. Cl. .................................. 426/641; 426/805

(58) Field of Classification Search .................. 426/641, 426/805
See application file for complete search history.

(56) References Cited

U.S. PATENT DOCUMENTS

| | | | |
|---|---|---|---|
| 3,115,409 A * | 12/1963 | Hallinan et al. | 426/641 |
| 3,595,681 A * | 7/1971 | Kaplow et al. | 426/324 |
| 3,732,112 A * | 5/1973 | Frankenfeld et al. | 426/532 |
| 3,808,340 A * | 4/1974 | Palmer | 426/92 |
| 3,852,483 A * | 12/1974 | Oborsh et al. | 426/94 |
| 4,892,748 A | 1/1990 | Andersen et al. | |
| 4,910,038 A | 3/1990 | Ducharme | |
| 4,990,356 A * | 2/1991 | Hamilton et al. | 426/623 |
| 5,084,297 A | 1/1992 | Merrick | |
| 5,198,253 A * | 3/1993 | Roskowiak et al. | 426/93 |
| 5,773,070 A | 6/1998 | Kasemzadehl | |
| 5,869,121 A * | 2/1999 | Brescia et al. | 426/281 |
| 5,989,604 A * | 11/1999 | Wolf et al. | 426/103 |
| 6,223,693 B1 * | 5/2001 | Perlberg et al. | 119/707 |
| 6,228,418 B1 | 5/2001 | Gluck et al. | |
| 6,238,726 B1 | 5/2001 | Fischer | |
| 2004/0156883 A1 * | 8/2004 | Brown et al. | 424/442 |
| 2005/0069624 A1 * | 3/2005 | Liu | 426/645 |

FOREIGN PATENT DOCUMENTS

CA          796683  A  * 10/1968

* cited by examiner

*Primary Examiner* — C. Sayala
(74) *Attorney, Agent, or Firm* — Polsinelli Shughart PC

(57) ABSTRACT

The present invention relates to a moist pet treat and a method of making the pet treat. More particularly, the invention relates to a moist pet treat comprising an animal by-product selected from the group consisting of a snout, ear, lung, heart, brain, cartilage, organ tissue, muscle tissue, and bone tissue and a humectant.

19 Claims, No Drawings

ANIMAL BY-PRODUCT PET TREAT

FIELD OF THE INVENTION

The present invention relates to a moist pet treat and a method for making the pet treat. In particular, the pet treat is formed from an animal by-product and a humectant.

BACKGROUND OF THE INVENTION

Pet owners have a variety of commercially available pet treats to choose from, including rawhide, jerky treats, and biscuits. Two types of treats are animal or meat product derivatives, and starch based products that include meat palatability enhancers. Both treat types have a meat based flavor to which cats and dogs are attracted. Generally, meat or poultry broth concentrate or powder, such as liver digest, function as a palatability enhancer in starch based pet treats. Thus, there are meat and meat flavored treats available which are desired by consumers.

Starch based pet treats, however, suffer from a number of drawbacks including being brittle or hard. The starch treats also have a tendency to become hard after the treat has been removed from its packaging. Harder pet treats are difficult for pets to chew and may not be desirable to pets having sensitive teeth or gums. For this reason alternatives to hard starch based treats are desired such as soft moist pet treats.

Animal derivative products are usually by-products including ears, snouts, hooves, and other animal parts. By-products have a couple of problems; first bacteria, mold, and yeast will grow on these products, if the moisture content is higher than 14%. If the moisture content is less than 14% it is likely that the treats are hard and in some cases brittle. As stated, many consumers prefer a soft and "moist" treat. Most of the by-products are cooked in an oven-like process and dried to a moisture content of less than 15%, whereby most of the free water has been removed. This moisture content is critical to make the product shelf stable. The resultant low moisture content yields a hard treat, such as a cooked and dried pig ear. Currently, available animal pet treats made with bones, rawhide, cow tails, pig ears and cow snouts, are generally very hard and not very easy for a pet to chew. Generally, younger pets with undeveloped teeth or older pets having fewer teeth also have a hard time with these types of treats. Thus, animal by-products suffer from either too much moisture or being hard and sometimes brittle.

There are options for making soft animal by-product treats, that have a sufficiently low bacteria count. Unfortunately, many of these products have deficiencies. For example, one pet treat currently available mixes turkey meat with turkey liver, followed by an anti-oxidant. The mixture is emulsified and mixed with other additives and extruded to form a sausage like product. Such an extrusion process is capital intensive, as it includes mills, mixers, an extruder, and a drier.

Another animal pet treat currently available is a soft rawhide product that is made by soaking animal rawhide in a humectant and at least one antimicrobial agent. Although this process produces a moist pet treat that is palatable to a pet, it also includes an antimicrobial agent, such as hydrogen peroxide. The use of antimicrobial agents, such as hydrogen peroxide, can adversely affect a pet by causing organ and tissue damage. Thus, a moist pet treat with a low microbial count is desired without the addition of an antimicrobial agent.

As described above, there are various problems with currently available soft animal treats. The pet treats that are soft, generally have a high moisture content. This moisture content may lead to bacterial growth that if consumed by a pet, may make the pet sick. The pet treats that include an antimicrobial agent to prevent such bacterial growth may also be detrimental to the pet, as consumption of the antimicrobial agent may also make the pet sick. There is, therefore, still a need for a pet treat that is soft, moist, and does not promote bacterial growth while also not including antimicrobial agents.

SUMMARY OF THE INVENTION

The present invention is directed to a pet treat formed from an animal by-product and an amount of a humectant. The present invention also includes methods for producing the product. Resultant treats include humectant infused snouts, ears, lungs, hearts, brains, cartilage, organ tissue, muscle tissue, and bone tissue.

The process includes cooking and drying the animal by-product, and contacting the cooked animal by-product with a humectant to form the moist pet treat. The humectant infuses into the pet treat. The resultant treat will have an interactivity such that growth of bacteria and fungus will be inhibited. Furthermore, cooking the by-product kills indigenous bacteria and fungus that may have populated the product prior to treatment. Even though the water activity is comparatively low, the amount of water present will be sufficient to prevent the treat from being brittle or hard. As such, the water will cause the treat to be soft and pliable.

Ultimately, for example, a sheep lung can be produced that has a soft pliable texture and reduced water activity.

DESCRIPTION OF THE PREFERRED EMBODIMENTS

In accordance with the present invention, a process for making a moist pet treat derived from animal by-products has been discovered. Related to the process the resultant pet treats derived from the animal by-products have also been discovered. In particular, the invention allows for the use of certain by-products, such as a lung, cartilage, pig ears, liver, muscle tissue, and bone tissue. The resultant treat is shelf stable and of a soft and pliable nature. Thus, a product can be produced that is derived from an animal by-product, but has a reduced water activity. The product will also contain a sufficient amount of water and other constituents to be moist, soft, and pliable.

The moist pet treat of the present invention is generally made by a process that includes cooking an animal by-product and contacting the animal by-product with a humectant. In addition, if the desired moisture content is not achieved during the cooking operation, an additional drying operation may be necessary.

In particular, the process starts by preferably cleaning an animal by-product that includes snouts, ears, lungs, hearts, brains, cartilage, organ tissue, muscle tissue, bone tissue, and any other animal by-product. The animal by-product of the present invention can be derived from a variety of animals including cow, sheep, pig, chicken, turkey, fish, ostrich, buffalo, water buffalo, steer, bull, rabbit, and other domesticated farm animals. Generally, the animal by-product is obtained from a slaughter house. Examples of products that can be used are a sheep's lung, pig's ear, fish filet, cow liver, or animal bone. As mentioned, the animal by-product may be subjected to a washing operation prior to the cooking operation. The washing operation starts with contacting the animal by-product with a cleansing liquid to remove any particulates remaining from when the animal was slaughtered. Typically, the cleansing liquid is water.

The cleaned by-product is then cooked at a temperature and time sufficient to kill or substantially reduce the indigenous microorganisms. The kill should be sufficient to prevent repopulation of the microorganisms, and of a level sufficient to prevent an animal that later consumes the treat from getting sick. The cooking operation can be accomplished using a variety of devices and methods. For example, the cooking operation may be achieved by using direct or indirect heating. Examples of direct heating include, but are not limited to, heating with hot air, steam, hot water, direct flame, or ionized energy. Examples of indirect heating include heating through heat exchangers, or other heating operations. A typical heated cooking operation includes placement of the product in a heated room or walk-in oven wherein the by-product can be cooked in bulk. Preferably the process includes using convention heating, radient heating, or some other form of "dry" heating. Dry heating will not only cook the product, but causes the removal of moisture present in the by-products.

Any of a variety of temperatures can be used to cook the product so long as the protein is not denatured, microorganisms are killed, and some water is evaporated. Preferably, the cooking operation includes cooking the animal by-product at a temperature of from about 57° C. to about 110° C., more preferably from about 60° C. to about 100° C. The cooking operation will last for between about 30 min to about 48 hrs. The selected time and temperature should be sufficient to reach a moisture content of from about 3% to about 30% by weight of the finished cooked product, more preferably from about 10% to about 20% by weight. Of course those skilled in the art will appreciate that the cooking time will vary depending on the materials being cooked and the desired outcome, as the by-products will vary in size, density, and shape.

In addition, if the desired moisture content is not achieved during the cooking operation an additional drying operation may be necessary. Generally, any method of removing additional moisture from the animal by-product may be used. For example, the cooked animal by-product may be placed on a drying rack at ambient conditions until the desired moisture is achieved. Alternatively, the cooked animal by-product may be subjected to additional direct or indirect heating to achieve the desired moisture.

In accordance with the present invention it has been discovered that a humectant may be added to a cooked and dried, to some degree, animal by-product to increase the moisture content and water activity of the animal by-product and make the pet treat softer and easier to chew. A humectant is a hygroscopic substance that is generally used as a food additive. The hygroscopic substance binds water, meaning the water is not available to microorganisms. Further, the presence of water maintains the pliable nature of the product. In addition, because a humectant binds water, bacterial or mold growth, that could potentially occur when moistened food products are left at ambient conditions, is prevented.

As such, after the cooked animal by-product is removed from the cooking apparatus it is subjected to an infusion operation where a humectant solution is contacted with the cooked by-product. Essentially, the humectant or humectant solution will infuse into the treat due to concentration differences, moisture differences, and pressure differences. Preferably, the cooked animal by-product is contacted with a humectant or humectant solution at a temperature and for a time sufficient to bind any excess water with the humectant and to soften the cooked animal by-product.

Preferably, the infusion operation generally comprises contacting the animal by-product with a humectant or humectant solution in a suitable vessel to moisten the animal by-product. Typically, the temperature of the humectant during the infusion operation is from about 21° C. to about 43° C., more preferably from about 23° C. to about 38° C. Typically the infusion operation lasts for between 10 min and 120 min, preferably from about 20 min to about 60 min. Alternatively, the humectant may be vacuum infused into the cooked animal by-product.

Preferably, the humectant is selected from the group comprising propylene glycol, glycerin, sorbitol, mannitol, xylitol, maltitol, corn syrup, sugars, alcohol sugars, mineral salts, metal salts and mixtures thereof. The humectant may be derived from metal and minerals salts, such as sodium chloride, calcium chloride, potassium chloride, among others. The preferred humectant used in the infusion operation is propylene glycol, glycerin, or mixtures thereof. Of course those skilled in the art will appreciate that any other humectant suitable for consumption may be used in accordance with the present invention.

In general, the infusion operation comprises contacting the cooked animal by-product with a mixture of a humectant and water. In general, the strength or concentration of the humectant and water mixture may vary depending on the initial moisture content present in the animal by-product being infused and the desired moisture of the moist pet treat. The mixture will be a solution of from about 30% to about 99% by weight humectant and from about 1% to about 70% by weight water. Preferably, the infusion operation comprises contacting the cooked animal by-product with a mixture of from about 50% to about 90% by weight humectant and from about 10% to about 50% by weight water.

Generally, a moist pet treat is a pet treat having soft and pliable characteristics reminiscent of a higher moisture-containing product. Those skilled in the art will appreciate that the moisture content will vary depending on the desired texture of the pet treat and the humectant type. An acceptably low moisture content can lead to a safe or shelf stable water activity.

The process of making a moist pet treat may be conducted in a batch, semi-continuous, or continuous mode and it may be carried out using a variety of apparatus and process techniques. In some instances, some process steps may be omitted or combined with other process steps without departing from the scope of the present invention.

After the infusion operation, the animal by-product may be subjected to a removal operation, whereby excess solution is removed from the pet treat. Preferably, after the animal by-product is removed from the mixture of humectant and water it is placed on a drying rack at ambient conditions so that any excess mixture is either absorbed by the animal by-product or air dried. An alternate method for removing excess solution is by physically expelling the solution by compression.

The resultant moist pet treat has at least about 50% by weight animal by-product selected from the group consisting of a snout, ear, lung, heart, brain, cartilage, organ tissue, muscle tissue, and bone tissue. Preferably, the moist pet treat comprises from about 40% to about 90% by weight animal by-product selected from the group consisting of a snout, ear, lung, heart, brain, cartilage, organ tissue, muscle tissue, and bone tissue, more preferably from about 45% to about 80% by weight animal by-product, from about 5% to about 30% by weight humectant, and from about 5% to about 25% by weight water. In addition, the pet treat of the present invention will have a water activity of less than about 0.8, more preferably less than about 0.75, even more preferably less than about 0.65, and yet more preferably less than about 0.6.

In addition to an animal by-product and humectant, the moist pet treat may comprise other additives such as seasonings, flavoring, or coloring agents to improve the taste and or appearance of the pet treat. The moist pet treat of the present invention, however, does not contain any anti-microbial agents or chemical preservatives. It may be desired from time to time to add mold inhibitors when critical levels of water are added. In addition, the present invention may also include herbal extracts for health benefits, enzymes for digestive disorders, and vitamins for nutritional benefits, among others.

The moist pet treat of the present invention retains its softness or moisture. In fact, the moist pet treat of the present invention retains its moisture even after exposed to atmospheric conditions for an extended period of time.

The following examples are simply intended to further illustrate and explain the present invention. The invention, therefore, should not be limited to any of the details in these examples.

DEFINITIONS

Water activity, or $a_w$, is the relative availability of water in a substance. It is defined as the vapor pressure of water in a product divided by that of pure water at the same temperature. Higher $a_w$ substances tend to support more microorganisms. Bacteria usually require at least 0.91, fungi at least 0.7, and mold as low as 0.62.

Cooking is a process of heating that kills or substantially reduces the indigenous microorganisms (depending on temperature, cooking time, and technique used). It is desired to reach a minimum temperature of 60° C. (140° F.) and hold for at least 30 minutes to achieve the minimum pasteurization eliminating pathogenic bacteria and reducing microorganism counts in the by-product.

EXAMPLES

Example 1

Fresh lamb lung was sliced into ¾" thick slices and placed in an oven. The raw lamb slices were cooked and dried at 180° F. for 24 hours. After 24 hours the cooked and dried lungs had a moisture content of 8% with a hard crunchy texture. The cooked and dried slices, having a water activity of about 0.6, were placed into various humectant solutions and the humectant solution was allowed to infuse, by absorption, into the dried pet treats at ambient conditions over a period of time. Samples were removed of various time intervals and evaluated for water activity, texture, and appearance. Results are reported in Table 1 below.

TABLE 1

| Infusion Time (hrs) | Humectant Solution | Appearance | Texture |
| --- | --- | --- | --- |
| 12 | 66% Glycerin and 33% Water | Moist Looking | Hard Center, Softening Outside, not infused to the core |
| 12 | 50% Glycerin and 50% Water | Moist Looking | Hard Center, Softening Outside, not infused to the core |
| 12 | 50% Propylene Glycol and 50% Water | Moist Looking | Hard Center, Softening Outside, not infused to the core |
| 24 | 66% Glycerin and 33% Water | Moist Looking | Firm center not fully infused to core |
| 24 | 50% Glycerin and 50% Water | Moist Looking | Firm center not fully infused to core |
| 24 | 50% Propylene Glycol and 50% Water | Moist Looking | Firm center not fully infused to core |
| 48 | 66% Glycerin and 33% Water | Moist Looking | Soft center - fully infused |
| 48 | 50% Glycerin and 50% Water | Moist Looking | Soft center - fully infused |
| 48 | 50% Propylene Glycol and 50% Water | Moist Looking | Soft center - fully infused |

The moist pet treats after 48 hours in the humectant solutions had a water activity of 0.609.

Example 2

The cooked and dried lamb lung slices of Example 1 were placed in a vacuum chamber with a humectant solution of 66% glycerin and 33% water. A vacuum of 80 Torr was pulled on the lamb lung treats in the presence of humectant solution. The chamber vacuum was held for 30 minutes before being released. The chamber was placed under vacuum a second time at 80 Torr for 30 minutes. The uptake of humectant solution achieved was equal to the uptake achieved in Example 1 but at a much faster rate of 1 hour.

Example 3

Chicken breast was sliced into ¾" thick slices and placed in an oven. The raw chicken breast were cooked to 180° F. and then allowed to dry for 24 hours. After 24 hours the breast slices were dried to a moisture content of 8% with a hard crunchy texture. The dried slices were soaked in a solution of humectant and water of 60% glycerin and 40% water for 48 hours. The humectant solution infused into the chicken breast slices and formed a shelf stable soft product with high palatability.

The above description of the preferred embodiments is intended only to acquaint others skilled in the art with the invention, its principles, and its practical application, so that others skilled in the art may adapt and apply the invention in its numerous forms, as may be best suited to the requirements of a particular use. The present invention, therefore, is not limited to the above embodiments, and may be variously modified.

With reference to the use of the word(s) "comprise" or "comprises" or "comprising" in this specification (including the claims), Applicants note that unless the context requires otherwise, those words are used on the basis and clear understanding that they are to be interpreted inclusively, rather than exclusively, and that Applicants intend each of those words to be so interpreted in construing this specification (including the claims).

What is claimed is:

1. A process of making a moist pet treat, the process consisting of:
   a. cooking an animal by-product selected from the group consisting of a intact or slices of snout, ear, lung, heart, brain, cartilage, organ tissue, muscle tissue, and bone tissue, whereby the cooked animal by-product has a total moisture content of from about 3% to about 30% by weight;
   b. contacting the animal by-product with a humectant to cause formation of a moist humectant infused pet treat having a water activity of less than 0.8;
   c. wherein the animal by-product is contacted with a humectant at a temperature and for a time sufficient to form a pet treat having between 5% and 50% by weight total humectant.

2. The process of claim 1, wherein the animal by-product is derived from an animal selected from the group consisting of a cow, sheep, pig, chicken, turkey, fish, ostrich, buffalo, water buffalo, steer, bull, rabbit and other domesticated farm animals.

3. The process of claim 1 wherein the animal by-product is cooked at a temperature of from about 57° C. to about 110° C.

4. The process of claim 3, wherein the animal by-product is cooked for between about 30 min and 48 hrs.

5. The process of claim 1, wherein the humectant is selected from the group consisting of propylene glycol, glycerin, sorbitol, mannitol, xylitol, maltitol, corn syrup, sugars, alcohol sugars, mineral salts, metal salts and mixtures thereof.

6. The process of claim 5, wherein the humectant is mixed with water to form a humectant mixture prior to contacting the animal by-product with the humectant.

7. The process of claim 6, wherein the mixture consists of from about 40% to about 99% by weight humectant and from about 1% to about 60% by weight water.

8. The process of claim 1, whereby the pet treat has a water activity of 0.65.

9. A moist pet treat consisting of:
   a. a cooked animal by-product selected from the group consisting of a intact or slices of snout, ear, lung, heart, brain, cartilage, organ tissue, muscle tissue, and bone tissue, whereby the cooked animal by-product has a total moisture content of from about 3% to about 30% by weight;
   b. a humectant, whereby the pet treat has a water activity of less than 0.8; and,
   c. wherein the moist pet treat does not include any antimicrobial agents or chemical preservatives.

10. The pet treat of claim 9, wherein the animal by-product is derived from an animal selected from the group consisting of a cow, sheep, pig, chicken, turkey, fish, ostrich, buffalo, water buffalo, steer, bull, rabbit and other domesticated farm animals.

11. The pet treat of claim 9, wherein the humectant is selected from the group consisting of propylene glycol, glycerin, sorbitol, mannitol, xylitol, maltitol, corn syrup, sugars, alcohol sugars, mineral salts, metal salts and mixtures thereof.

12. The pet treat of claim 9, wherein the pet treat consists of from about 45% to about 80% by weight animal by-product, from about 5% to about 50% by weight humectant, and from about 5% to about 25% by weight water.

13. The pet treat of claim 12, wherein the humectant is selected from the group consisting of propylene glycol, glycerin, sorbitol, mannitol, xylitol, maltitol, corn syrup, sugars, alcohol sugars, mineral salts, metal salts and mixtures thereof.

14. A treated chicken meat pet treat consisting of chicken meat wherein the chicken meat includes, intact chicken muscle tissue, chicken organ tissue, chicken bone tissue, sliced chicken muscle tissue, sliced chicken organ tissue, and sliced chicken bone tissue and a humectant, whereby the pet treat has a water activity of less than 0.8.

15. The pet treat of claim 14, wherein the humectant is selected from the group consisting of propylene glycol, glycerin, sorbitol, mannitol, xylitol, maltitol, corn syrup, sugars, alcohol sugars, mineral salts, metal salts and mixtures thereof.

16. A sheep lung pet treat consisting of a humectant and a cooked intact sheep's lung or slice of lamb lung, whereby the pet treat has a water activity of less than 0.8.

17. A fish fillet pet treat consisting of a humectant and a cooked intact fish fillet or a slice of fish fillet, whereby the pet treat has a water activity of less than 0.8.

18. A turkey meat pet treat comprising consisting of a humectant and a cooked turkey meat wherein the turkey meat includes intact turkey muscle tissue, turkey organ tissue, turkey bone tissue, slices of turkey muscle tissue, slices of turkey organ tissue, and slices of turkey bone tissue, whereby the pet treat has a water activity of less than 0.8.

19. A process of making a moist pet treat, the process consisting of:
   a. washing an animal by-product to remove impurities;
   b. cooking the animal by-product selected from the group consisting of an intact or slices of snout, ear, lung, heart, brain, cartilage, organ tissue, muscle tissue, and bone tissue;
   c. drying the animal by-product to a total moisture content of from about 3% to about 30% by weight;
   d. contacting the animal by-product with a humectant to cause formation of a moist humectant infused pet treat having a water activity of less than 0.8;
   e. wherein the animal by-product is contacted with a humectant at a temperature and for a time sufficient to form a pet treat having between 5% and 50% by weight total humectant; and,
   f. removing any excess humectant from the animal by-product.

* * * * *